(12) United States Patent
Brancaleone et al.

(10) Patent No.: US 7,699,285 B2
(45) Date of Patent: Apr. 20, 2010

(54) AUTOMOTIVE MIRROR MOUNTING SYSTEM

(75) Inventors: Robert A. Brancaleone, Farmington Hills, MI (US); Craig S. Pearson, Northville, MI (US)

(73) Assignee: Ford Global Technologies, Dearborn, MI (US)

( * ) Notice: Subject to any disclaimer, the term of this patent is extended or adjusted under 35 U.S.C. 154(b) by 35 days.

(21) Appl. No.: 12/042,725

(22) Filed: Mar. 5, 2008

(65) Prior Publication Data

US 2009/0225459 A1    Sep. 10, 2009

(51) Int. Cl.
*A47G 1/16*    (2006.01)
*G02B 7/182*    (2006.01)

(52) U.S. Cl. .................... 248/475.1; 359/871

(58) Field of Classification Search ............. 248/475.1, 248/466, 544; 359/879, 871, 841; 296/146.6
See application file for complete search history.

(56) References Cited

U.S. PATENT DOCUMENTS 3,337,177 A * 8/1967 Yorck ........................ 248/483
4,422,724 A * 12/1983 Otsuka et al. ............... 359/875
4,867,409 A    9/1989 Fimeri
4,905,954 A * 3/1990 Taylor ..................... 248/475.1
5,238,214 A    8/1993 Syamoto et al.
5,294,084 A    3/1994 Syamoto et al.
6,036,325 A * 3/2000 Su .............................. 359/871
6,109,586 A    8/2000 Hoek
6,220,716 B1 * 4/2001 Asaka ........................ 359/871
6,239,928 B1 * 5/2001 Whitehead et al. .......... 359/871
6,637,900 B2  10/2003 Ohashi
6,916,100 B2    7/2005 Pavao
7,035,678 B2    4/2006 Lynam et al.
7,144,125 B2  12/2006 Shinohara
7,156,449 B2    1/2007 Vijaywargiya et al.
2004/0129853 A1    7/2004 Suzuki et al.
2005/0134985 A1    6/2005 Mueller
2005/0174645 A1    8/2005 Boddy et al.
2005/0200987 A1    9/2005 Pavao

* cited by examiner

*Primary Examiner*—Anita M King
(74) *Attorney, Agent, or Firm*—Jerome R. Drouillard; Greg Brown

(57) ABSTRACT

An external mirror mounting system for an automotive vehicle includes an outer panel having a mounting reinforcement attached to an inner surface, and an extended outer belt reinforcement which is mounted with stand off structures to the mounting reinforcement, so that a box section is constituted for supporting a mirror attached to the outer surface of the outer panel.

12 Claims, 3 Drawing Sheets

AUTOMOTIVE MIRROR MOUNTING SYSTEM

CROSS REFERENCE TO RELATED APPLICATIONS

None.

BACKGROUND OF THE INVENTION

1. Field of the Invention

The present invention relates to a structural system for attaching a mirror, such as a side-view mirror, to an external surface of an automotive vehicle such as a side door. Side view mirrors are frequently mounted upon the driver's door of a vehicle.

2. Disclosure Information

Side view mirrors have been used for many years on automotive vehicles. Such mirrors work best when they're not subject to excessive vibration caused by either the vehicle's power train, or by vibrational loads transmitted into the mirror mounting system by the vehicle's body. One solution for producing rigid mounting of a mirror involves placing the mirror on a door within the so-called "sail" portion where the door sash is joined to the upper portion of the door's side panel. Unfortunately, this mirror placement is sometimes awkward with certain vehicles and as a result, mounting of the mirror on the outer door panel is preferred. Such a mounting is, however, problematic inasmuch as excessive vibration may greatly diminish the mirror's usefulness. Attempts have been made to solve the problem of excessive vibration by merely attaching a doubler, which is another thickness of metal, or other material, to the inside of the door's outer panel in the region pierced by the mirror's fasteners. However, such a doubler cannot begin to cope with vibrations commonly experienced with the larger mirrors used in many vehicles.

It would be desirable to provide a mirror mounting system for use with vehicular mirrors attached to a door, such as a driver's door, at a position other than the sail portion of the door, while providing excellent vibration control and therefore, excellent vision through the mirror for the driver.

SUMMARY OF THE INVENTION

According to an aspect of the present invention an external mounting system for an automotive vehicle mirror includes an outer panel having at least one external aperture receiving at least one mirror attachment structure. A mounting reinforcement is attached to an inner surface of the outer panel, with the mounting reinforcement having at least one reinforcement aperture indexed with the at least one external aperture. An outer belt reinforcement is attached to an inner surface of the outer panel and to an inner surface of the mounting reinforcement. The outer belt reinforcement has at least one aperture indexed with the external aperture and the reinforcement aperture. The outer belt reinforcement is separated from at least a portion of the mounting reinforcement by at least one stand off structure, so that the outer belt reinforcement and the mounting reinforcement constitute a box section for supporting a mirror mounted to the outer panel.

According to another aspect of the present invention, the outer panel may be constituted as a portion of a vehicle door.

According to another aspect of the present invention, a standoff structure used in the present invention may include one or more tubes, with each tube having a first end in contact with the mounting reinforcement, and a second end in contact at the outer belt reinforcement.

According to another aspect of the present invention, a mirror attachment structure may include either threaded fasteners which extend from a mirror base through external apertures formed in an external panel, such as a vehicle door, as well as extending through a number of reinforcement apertures and apertures formed in an outer belt reinforcement.

It is an advantage of a mirror mounting system according to the present invention that the box section which is created by the mounting system provides a robust structure which is capable of controlling vibration and preventing vibration from large mirror heads.

It is another advantage of a mounting system according to present invention that the outer belt reinforcement presently used in many vehicular doors may be extended and used in the present structure, thereby limiting a need for at least one extra part in order to achieve the desired stiffening and vibration reducing characteristics produced by the present mounting system.

Other advantages, as well as features of the present invention, will become apparent to the reader of this specification.

DETAILED DESCRIPTION OF THE PREFERRED EMBODIMENTS

Figure 1:
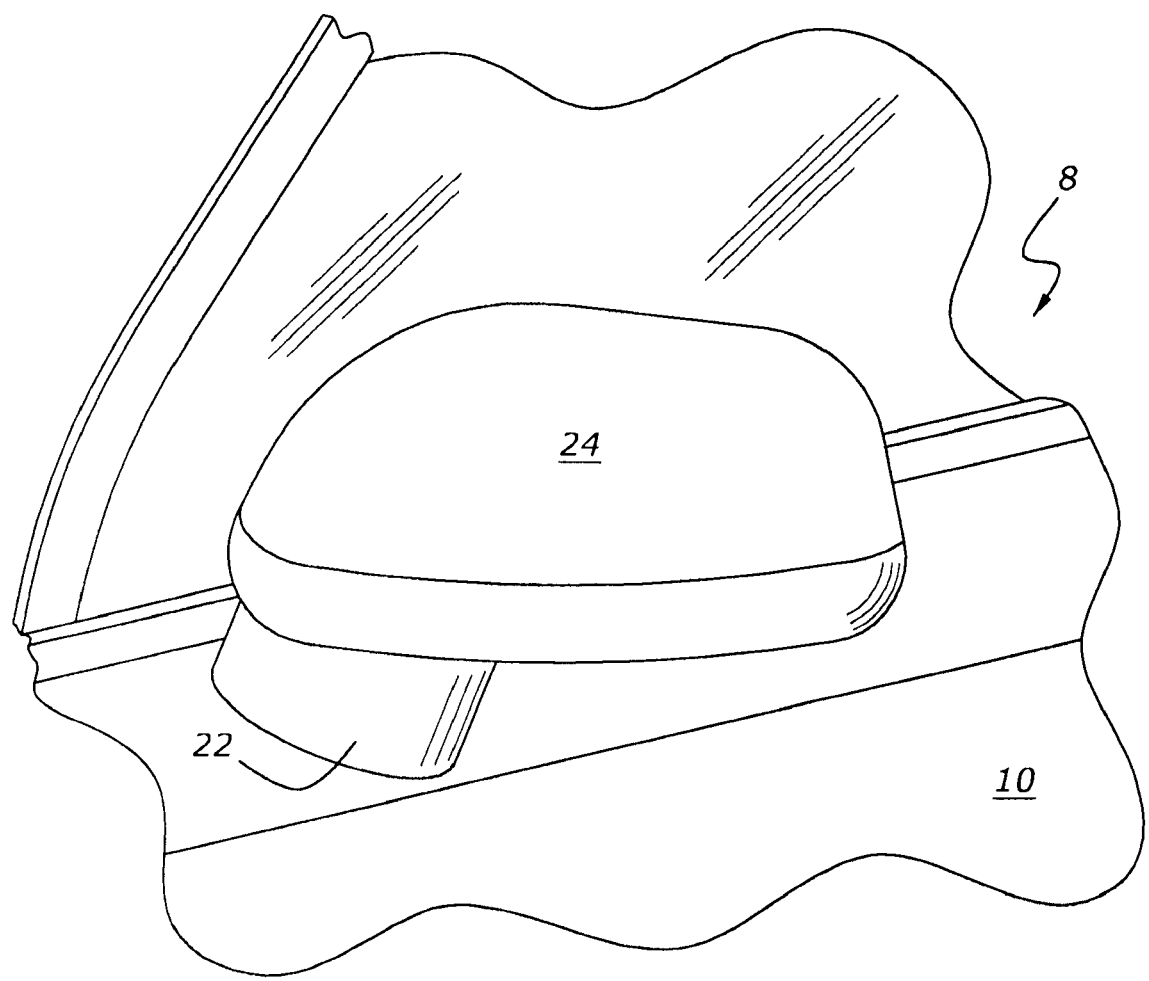
FIG. 1 is a perspective view of a vehicle door having a mirror mounted according to the present invention.
Figure 2:
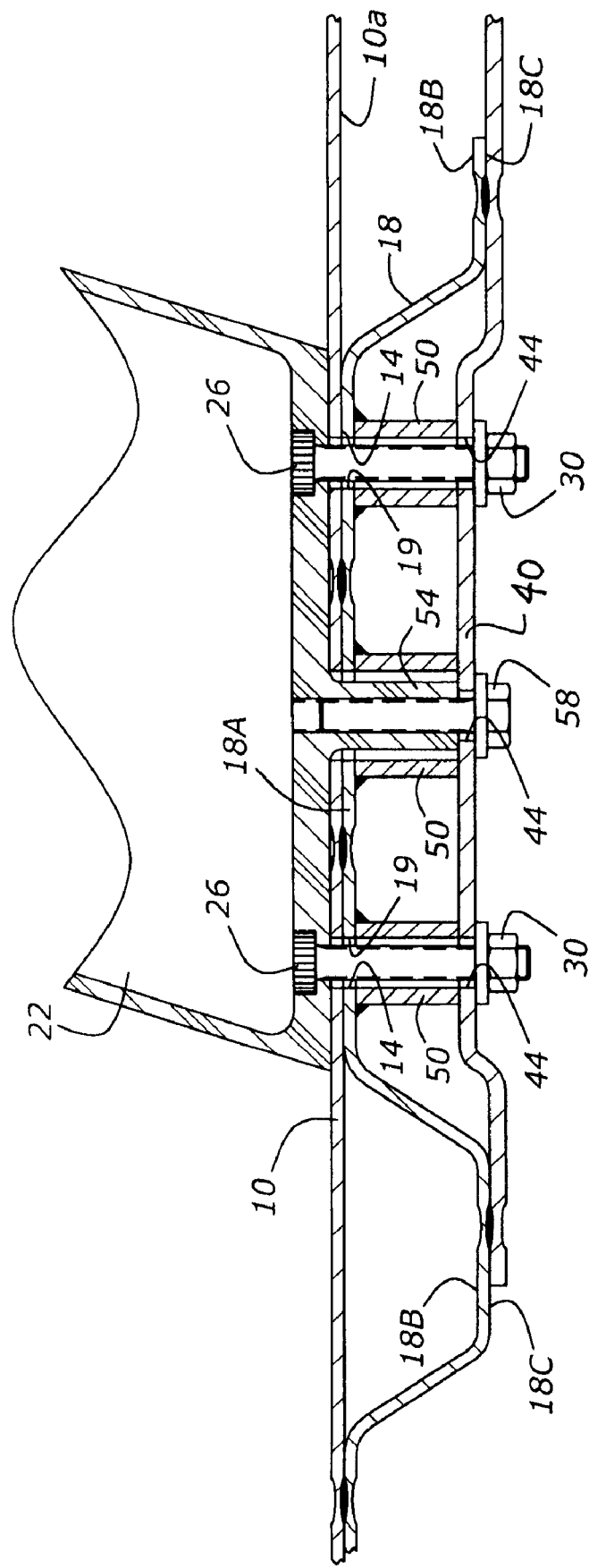
FIG. 2 is a sectional view taken in the direction of the line 2-2 of FIG. 1, showing various aspects of the present mirror mounting system.

As shown in FIG. 1, a door, 8, has an outer panel, 10, with a mirror base, 22, and a mirror head, 24, mounted thereto. The sail portion, which is not used in the present mirror mounting system is not shown, and is adjacent the present mirror mounting system. FIG. 2 is a sectional view showing a box section created by the present mirror mounting system. As seen in FIG. 2, mirror base 22 has a number of mirror attachment structures, which are shown either as studs 26, which are clamped to the remaining part of the structure by means of nuts 30, or alternatively, internally threaded lugs, 54, (with one being shown) which is clamped to the remaining part of the structure by means of bolt 58.

Mirror base 22 directly contacts the outer surface of outer panel 10. Outer panel 10 has apertures, 14, which allow the passage of mirror attachment structures 26 and alternatively, 54. Inner surface 10a of outer panel 10 is in contact with an outer surface of mounting reinforcement 18. Notice that mounting reinforcement 18 has a center section, 18A, which is raised up above the sections characterized by weld flanges 18B, which are welded at their inner surfaces, 18C, to outer belt reinforcement 40. It is further noteworthy in FIG. 2 that outer belt reinforcement 40 is maintained at a standoff from mounting reinforcement 18 by tubular columns 50, which function as standoff structures under column loading, with the understanding that taken together, columns 50, outer belt reinforcement 40, and mounting reinforcement 18 create a box section which is shown FIGS. 2 and 3.

Figure 3:
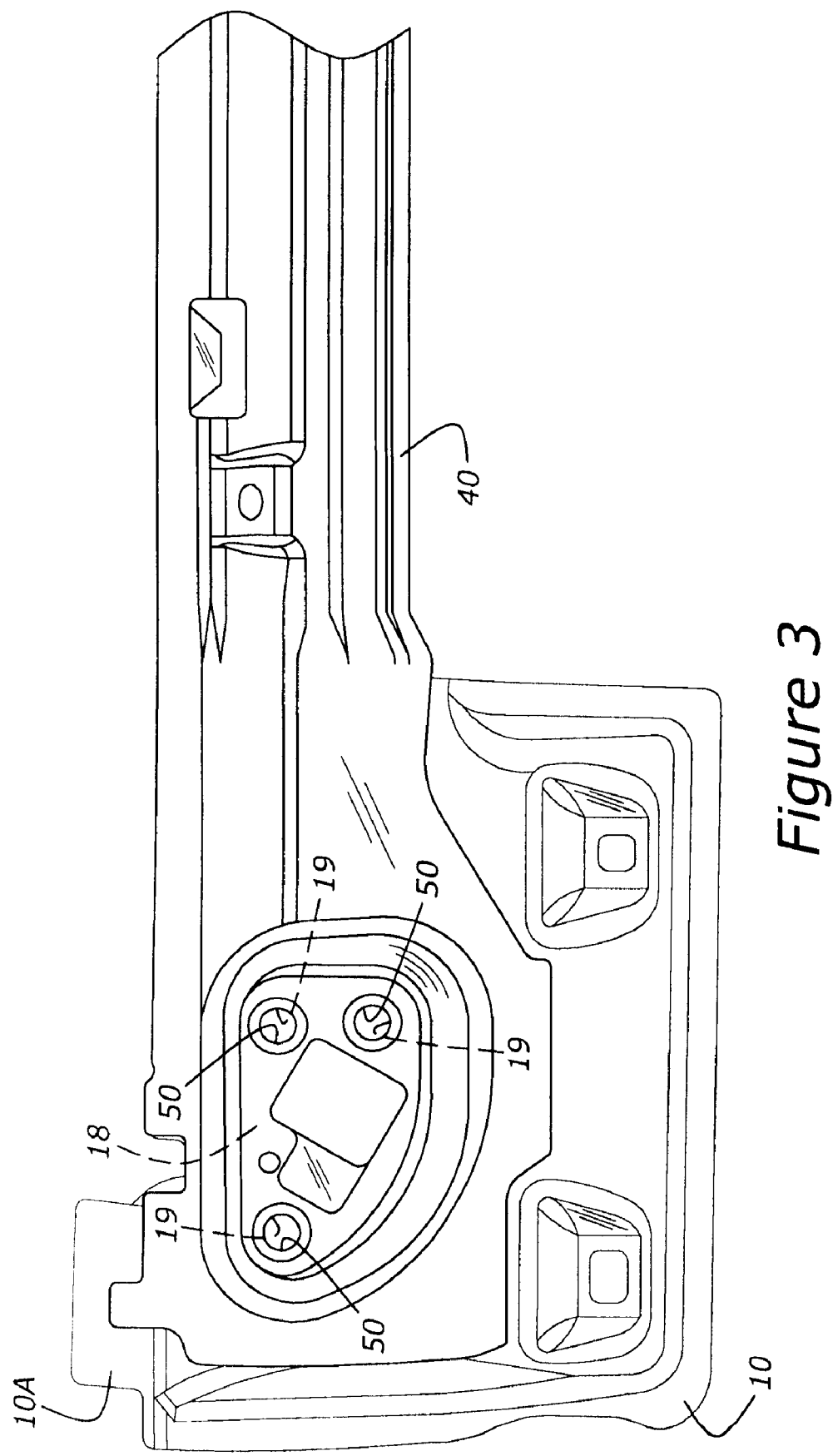
FIG. 3 is a plan view, taken from the inside of a vehicle door having a mirror mounting system according to the present invention.

It is easily seen from FIG. 3 that outer belt reinforcement 40 carries down and over, and is superimposed upon, mounting reinforcement 18. Notice, too, from FIG. 2 that outer belt reinforcement 40 sandwiches tubular columns 50 between itself and mounting reinforcement 18. In a preferred embodiment, tubular columns 50 are projection welded to mounting reinforcement 18 and allowed to float with respect to outer belt reinforcement 40, with the gap between tubular columns 50 and outer belt reinforcement 40 being taken up when fasteners 30 or 58, as the case may be are tightened.

Installation of mirror base 22 is easily accomplished with the present system once all of the component parts for the box section have been assembled. Accordingly, either threaded studs 26, or internally threaded lugs 54 are inserted through the indexed apertures defined by all three of outer panel 10, mounting reinforcement 18, and outer belt reinforcement 40. These apertures include: apertures 14, formed in outer panel 10; apertures 19, formed in mounting reinforcement 18; and apertures 44, formed in outer belt reinforcement 40. Once these components have been welded together along with tubular columns 50, the pathways for the threaded studs or threaded lugs are readily and visually established, thereby hastening and easily enabling installation of a mirror to a vehicle door or other panel. Those skilled in the art will appreciate in view of this disclosure that the number of tubular columns selected for use according to the present invention may be varied, and indeed, may be reduced to a single column, which may be configured with a non-circular cross section.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

We claim:

1. An external mirror mounting system for an automotive vehicle, comprising:
    an outer panel having at least one external aperture for receiving at least one mirror attachment structure;
    a mounting reinforcement attached to an inner surface of said outer panel, with said mounting reinforcement having at least one reinforcement aperture indexed with said at least one external aperture; and
    an outer belt reinforcement attached to an inner surface of said outer panel and to an inner surface of said mounting reinforcement, and having at least one aperture indexed with said external aperture and said reinforcement aperture, with said outer belt reinforcement being separated from at least a portion of said mounting reinforcement by at least one standoff structure, whereby said outer belt reinforcement and said mounting reinforcement constitute a box section for supporting a mirror mounted to said outer panel.

2. An external mirror mounting system according to claim 1, wherein said outer panel comprises a portion of a vehicle door.

3. An external mirror mounting system according to claim 1, further comprising a mirror base mounted to a plurality of fasteners extending through said at least one standoff structure.

4. An external mirror mounting system according to claim 1, wherein said at one standoff structure comprises a plurality of tubes, with each tube having a first end in contact with said mounting reinforcement, and a second end in contact with said outer belt reinforcement.

5. An external mirror mounting system according to claim 1, wherein said at least one mirror attachment structure comprises a plurality of threaded fasteners extending from a mirror base and through a plurality of external apertures, as well as through a plurality of reinforcement apertures and a plurality of apertures formed in said outer belt reinforcement.

6. An external mirror mounting system according to claim 1, wherein said at least one standoff structure comprises a plurality of tubes, with each tube having a first end welded to said mounting reinforcement, and a second end in contact with said outer belt reinforcement.

7. An external mirror mounting system for an automotive vehicle, comprising:
    a mirror base having a plurality of fasteners extending therefrom;
    an outer panel having a plurality of external apertures for receiving said plurality of fasteners;
    a mounting reinforcement attached to an inner surface of said outer panel, with said mounting reinforcement having a plurality of reinforcement apertures indexed with said external apertures; and
    an outer belt reinforcement attached to said inner surface of said outer panel and to an inner surface of said mounting reinforcement, and having a plurality of apertures indexed with said external apertures and said reinforcement apertures, with said outer belt reinforcement being separated from at least a portion of said mounting reinforcement by a plurality of generally tubular standoff structures indexed with said reinforcement apertures and with said apertures formed in said outer belt reinforcement, so as to permit passage of one of said fasteners through each of said standoff structures.

8. An external mirror mounting system according to claim 7, wherein said outer panel comprises a portion of a vehicle door.

9. An external mirror mounting system according to claim 7, wherein said outer belt reinforcement comprises a beam extending generally horizontally along said inner surface of said outer panel at a location proximate an opening in said panel.

10. An external mirror mounting system according to claim 7, wherein said plurality of fasteners comprises a plurality of threaded studs.

11. An external mirror mounting system according to claim 7, wherein said plurality of fasteners comprises a plurality of internally threaded lugs.

12. An external mirror mounting system according to claim 7, wherein said fasteners clamp said outer belt reinforcement to said mounting reinforcement, thereby forming a box section for supporting said mirror base.

* * * * *